July 27, 1965
B. A. HILLS
3,196,905
EXHAUST SYSTEM
Filed Nov. 6, 1962
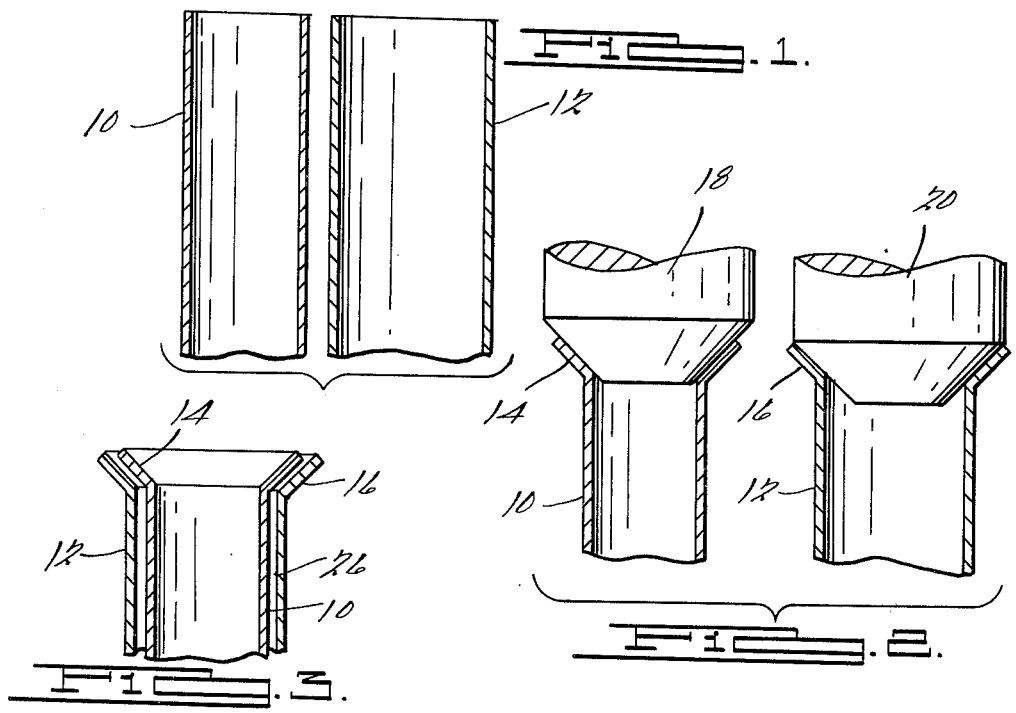
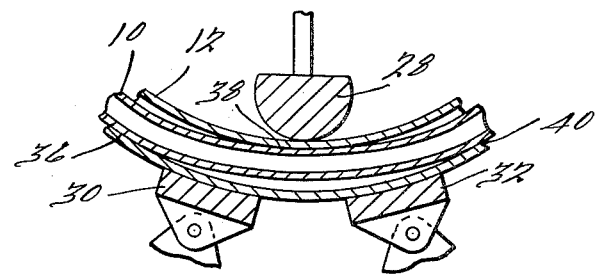
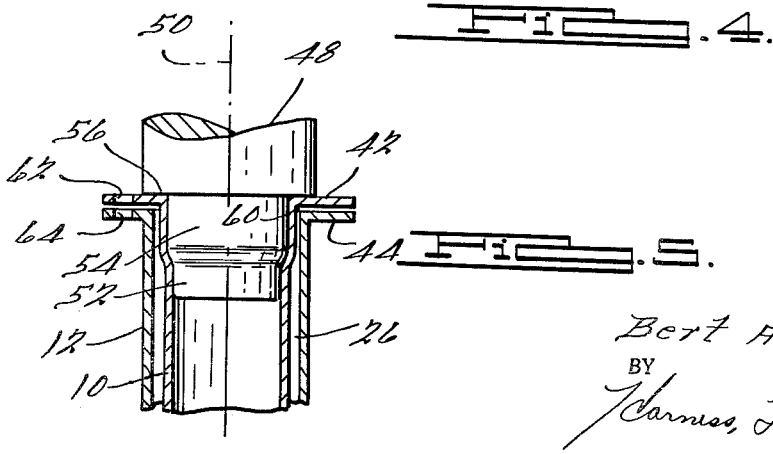
INVENTOR.
Bert A. Hills
BY
Harness, Dickey & Pierce
ATTORNEYS 3,196,905
EXHAUST SYSTEM
Bert Atley Hills, Jackson, Mich., assignor to Walker
Manufacturing Company, a corporation of Delaware
Filed Nov. 6, 1962, Ser. No. 235,715
6 Claims. (Cl. 138—148)

This invention relates to tubing and to methods of manufacture thereof. More particularly, the invention is related to laminated pipe for use in automotive exhaust systems or the like and to methods of manufacture of such pipe.

The use of laminated pipe for automobile exhaust systems has recently been adopted by many manufacturers. One of the problems in the use of laminated pipes is that gases may become trapped between the walls of the pipe and subsequently expand under the influence of hot exhaust gases carried through the pipe to cause deformation and destruction of the pipe. One common source of gas between the pipes is that formed by vaporization of oil films left on the pipe surfaces during manufacturing operations.

Exhaust pipes, for automobile exhaust systems or the like, are commonly provided with end flanges which extend radially at substantially 90° to the central axis of the pipe to provide means of attaching the pipe to the engine manifold. The flange area has previously been one of the major areas of pipe failure due to expansion of trapped gases. Apparently, the flange area has been a major source of trouble because of the manufacturing methods used to form the flange which have resulted in substantial sealing of the laminated pipes in the flange area. In previous practice the flange has commonly been formed at the completion of the manufacturing process by simultaneously spinning the straight ends of the pipe radially outwardly to form a 90° flange. The simultaneous working of the pipe ends from a straight condition to a flanged condition intimately associated the laminated pipe members and formed a sealed joint. Consequently, gas vapors which may later be formed between the laminations are trapped and have caused serious troubles including actual destruction of the pipe by inwardly and outwardly blown holes.

The present invention provides a new method of manufacture of a laminated pipe end flange having a breathing fit which enables gases trapped between the pipe laminations to escape. The laminated pipe flange is formed in a particular manner to insure that a breathing fit is maintained. In general, the method of forming the pipe to attain a breathing fit comprises the steps of forming a preliminary flange on each section of the laminated pipe prior to assembly, assembling the pipe laminations in telescopic relationship, forming the pipe into the various bends required for assembly on a vehicle, and thereafter finishing the forming of the end flanges of the pipe laminations simultaneously to form a radially extending flange portion formed from laminated pipe layers and having a breathing fit between adjacent layers to permit the escape of gases and the like subject to expansion forces between the laminations.

The objects, advantages, and the details of construction of the present invention are hereinafter disclosed in detail by reference to the accompanying drawings showing the invention diagrammatically and illustratively, wherein:

FIGURE 1 is a side elevational view, in section, of portions of pipe members to be telescopically associated to form a laminated pipe;

FIG. 2 is a side elevational view of the pipe members shown in FIG. 1 illustrating a preliminary forming operation;

FIG. 3 is a side elevational view, in section, of the pipe members of FIG. 1 telescopically assembled after the preliminary forming operation of FIG. 2;

FIG. 4 is a side elevational view, partly in section, of a portion of the pipe members of FIG. 1 during a bending operation performed after assembly along an intermediate portion thereof; and FIG. 5 is a side elevational view, partly in section, showing diagrammatically a final forming operation on the end of the telescopically assembled pipe of FIG. 1 and the resultant pipe structure.

Referring now to FIG. 1, the laminated exhaust pipe of the present invention is adapted to be made from sections of pipe 10, 12 of different diameters. The inside diameter of one of the pipes 12 is larger than the outside diameter of the other pipe 10 so that the pipes may be telescopically associated.

As shown in FIG. 2, at least one end of each of the pipes 10, 12, which are adapted to be connected to an engine manifold or the like, are formed into radially outwardly extending flanges 14, 16 by conventional spinning tools 18, 20, or the like.

The forming operation illustrated in FIG. 2 is a preliminary flange forming step and is adapted to bend the edges of the pipe radially outwardly to an angle less than the final 90° bend desired. In the preferred embodiment, the angle of bend obtained during the preliminary forming operation is shown to be approximately 45°.

After the end portions of the pipe members 10, 12 have been provided with partially formed flanged portions 14, 16 the pipe members are mounted in telescopic relationship as shown in FIG. 3 with the partially formed flanges 14 and 16 lying in closely spaced relationship. The exact relationship between the partially formed flange portions 14, 16 will vary depending on the relative diameters of the pipe members 10, 12. However, it will be noted that each of the flange portions has previously been formed to the same degree of angularity and that the adjacent surfaces of the flanges will be extending substantially parallel to one another at the particular degree of angularity imparted by the preliminary forming step. In addition, there may be actual physical contact along at least some areas of the outer flange surface of the inside pipe and the inside flange surface of the outer pipe. However, communication between the atmosphere and the interior space 26 between the pipes is maintained at all times over a substantial portion of the annular gap between the pipe flanges. The lengths of the flanges 14, 16 may be the same or may be varied as desired to obtain a uniform flange length after the final forming operation.

Referring now to FIG. 4, the telescoped pipe sections 10, 12 are thereafter bent into a sinuous shape in a conventional bending machine such as, for example, one having a ram 28 and wing dies 30, 32. The telescoped pipe sections are conventionally provided with a plurality of bends adapted to facilitate assembly beneath and in a vehicle frame or body. The bending of the telescope sections of the pipe forms a series of surface engagements between the pipe sections 10, 12, as illustrated at 36, 38, 40 so that after the pipe has been completely formed the telescoped sections 10, 12 are relatively rigidly secured and movement therebetween is prevented.

Referring now to FIG. 5, the end portions of the pipes 10, 12 are formed into radially extending flanges 42, 44 by a spinning tool 48 from the preliminary inclined position of approximately 45°, previously imparted, to a position extending substantially at right angles to the central axis 50 of the pipe assembly. The tool 48 may preferably be provided with a tapered approach surface 52 having an outer diameter at its lower end slightly smaller than the inner diameter of the inner pipe 10 and tapering outwardly to an enlarged expansion portion 54 having a diameter adapted to radially expand the straight end portion of the inner pipe 10 into close, but spaced, proximity to the inner periphery of the straight portion of the outer pipe 12.

The flanged portion 42 is simultaneously also radially outwardly displaced. The portion 54 terminates in a radially extending shoulder 56 which extends outwardly and is adapted to overlie the flange portions 42, 44 a sufficient distance to progressively complete the bend of the flange portions to approximately 90°. The tool 48 is progressively inserted into the laminated pipe to deflect the flange portions 42 and 44 from the intermediate position shown in FIGS. 2 and 3 to the final right angle flange forming position shown in FIG. 5. The forming operation sequence and the configuration of the spinning tool 36 insures that a breathing fit is maintained in the flange area between the pipe sections 10, 12. Thus, the internal space or chamber 26 formed between the walls of the pipes 10, 12 communicates with the atmosphere through passages 60 maintained throughout the area of bend. Gases formed within the pipe walls during subsequent use can, therefore, escape without damaging the pipe. The flange may subsequently, or otherwise, be provided with fastening apertures 62, 64 to facilitate securement of the pipe to a manifold or the like.

It is to be understood that the breathing fit shown in FIG. 5 is intended to be merely illustrative and not proportional in size or width to the other pipe contour or structure. The important feature is that the pipe be able to "breathe"—that is, communicate with the atmosphere along and through a substantial portion of the area of bend and adjacent portions of the flange and pipe to prevent pipe blow-out or deformation.

Since the inventive principles hereinbefore disclosed are capable of being utilized in alternative embodiments, it is intended that the appended claims be construed to cover the inventive principles wherever utilized.

The invention claimed is:

1. A laminated pipe assembly for automobile exhaust systems subject to high temperature conditions and having oil films thereon susceptible to vaporization at the high temperature conditions to form gases, said pipe assembly being formed from telescoped pipe members and having common flange means formed at one end, said flange means being formed by radially extending portions of each pipe lying substantially back-to-back in closely spaced relationship, and breathing passage means extending from the interiorly located space between said telescoped pipe members around the bend forming said flange means and radially outwardly to the atmosphere.

2. A laminated pipe assembly for automobile exhaust systems subject to high temperature conditions and having oil films thereon susceptible to vaporization at the high temperature conditions to form gases, the invention of breather means to prevent entrapment of such gases between the walls of the pipe assembly comprising inner and outer telescopically mounted pipe sections, the outer diameter of the inner pipe section being substantially less than the inner diameter of the outer pipe section to provide a substantial gap between said pipe sections, flange means formed on the ends of each section of pipe and extending substantially transversely to the longitudinal axes of said pipe sections in closely spaced relationship defining a common attachment flange, and the inner surface of said outer pipe section and the outer surface of said inner pipe section being spaced from one another throughout the area of bend connecting said flange means to the rest of said pipe sections.

3. The invention as defined in claim 2 and wherein the inner pipe section is a continuous one piece pipe and has a portion of increased diameter immediately adjacent said flange means and extending from a position within said pipe sections to the end of said pipe sections beyond said flange means.

4. A laminated pipe assembly for automobile exhaust systems subject to high temperature conditions and having oil films thereon susceptible to vaporization at the high temperature conditions to form gases, the invention of breather means to prevent entrapment of such gases between the walls of the pipe assembly comprising sections of telescopically mounted pipe, common flange means formed at the end of said sections of telescopically mounted pipe and by closely spaced portions of each pipe extending at approximately 90° relative to the longitudinal axis of said pipe, and means establishing communication between the space between the telescoped pipe on one side of the flange means and the atmosphere on the other side of the flange means.

5. A laminated pipe assembly for automobile exhaust systems subject to high temperature conditions and having oil films thereon susceptible to vaporization at the high temperature conditions to form gases, the invention of breather means to prevent entrapment of such gases between the walls of the pipe assembly comprising a plurality of elongated one piece pipe members of substantially equal lengths and of varying diameters telescopically mounted within one another and having substantially constant inner and outer diameters from end to end, at least one end portion of the pipe assembly including radially outwardly extending flange means on each pipe member extending radially outwardly substantially co-extensively with one another in closely spaced relationship and forming together a common attaching flange means for the assembly, the innermost pipe members having flange means of greater radial extent than the outermost pipe members, and the end portion of each pipe member including the flange means and the portion of the pipe members adjacent said flange means being spaced from one another to establish communication between the adjacent walls of the pipe members and the atmosphere along the adjacent surfaces of the flange means.

6. The invention as defined in claim 5 and wherein the portions of the innermost pipe members adjacent said flange means are radially outwardly enlarged relative to the diameter of the remaining portions of the pipe members.

References Cited by the Examiner

UNITED STATES PATENTS

| 1,954,454 | 4/34 | McFarland | 138—148 X |
| 2,165,357 | 7/39 | Emmert | 138—148 X |
| 2,386,747 | 10/45 | Ris | 138—111 |
| 2,441,196 | 5/48 | Kalitinsky | 60—29 |
| 2,693,026 | 11/54 | Simpelaar | 29—157.3 |
| 2,753,893 | 7/56 | Brown | 138—148 X |
| 2,913,009 | 11/59 | Kuthe | 138—38 |
| 2,929,408 | 3/60 | Weatherwax et al. | 138—38 |
| 3,064,336 | 11/62 | Powers et al. | 29—157 |
| 3,133,612 | 5/64 | Sailler | 138—148 XR |

FOREIGN PATENTS 926,578   4/55   Germany.

LEWIS J. LENNY, *Primary Examiner.*

WHITMORE A. WILTZ, *Examiner.*